2,877,593
SWIVEL ARM HOOK

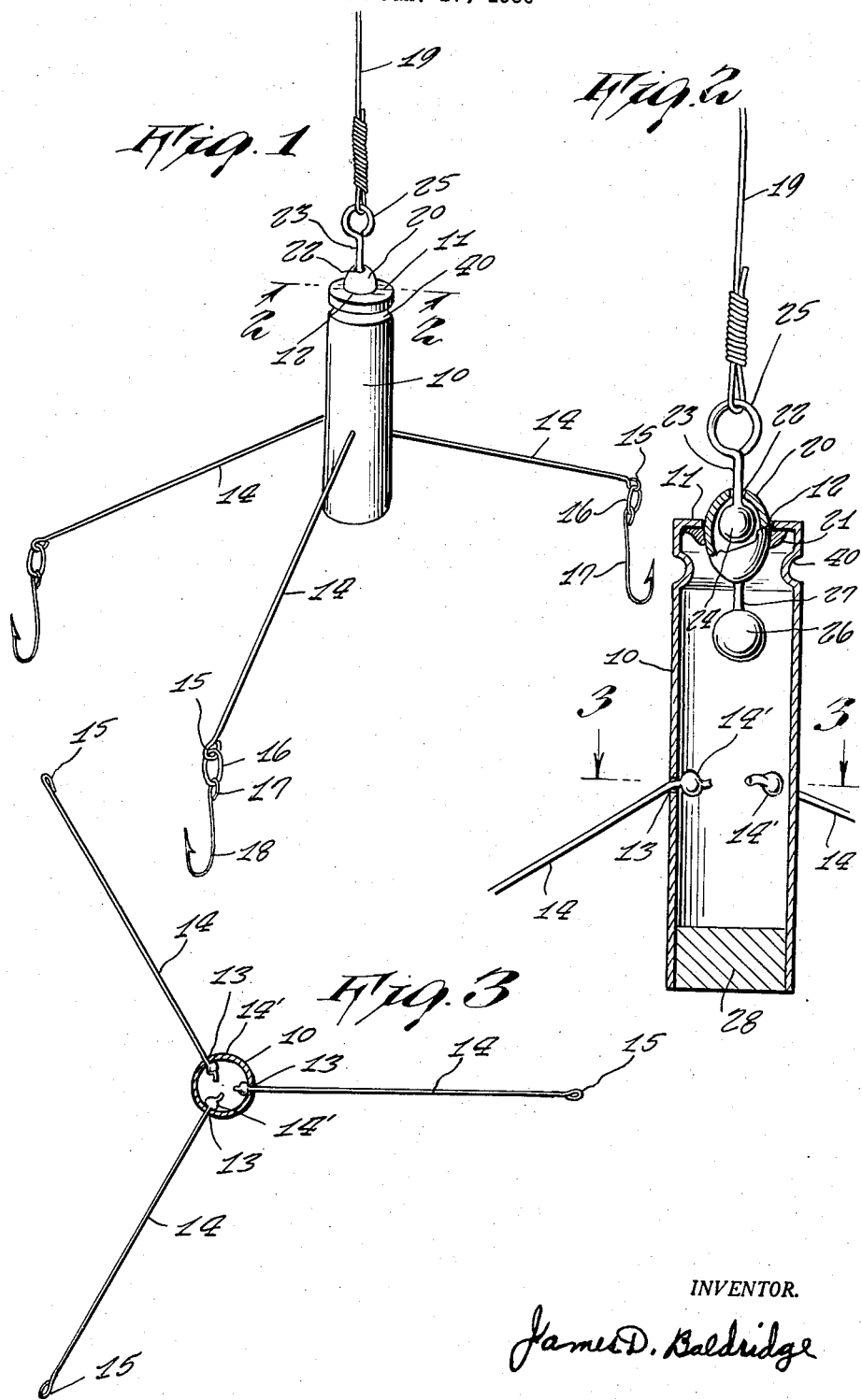

James D. Baldridge, Wilmington, Ohio

Application January 17, 1956, Serial No. 559,710

1 Claim. (Cl. 43—42.74)

This invention relates to a swivel arm hook for fishing lines.

It is an object of the present invention to provide a swivel arm hook for fishing lines which operates entirely upon the novel swivel attachment so that the swivel arm hook assembly will turn freely when the line is cast while the line will not twist and will remain stationary.

Another advantage of this swivel attachment construction resides in the fact that with undercurrent the fishing hook assembly will be permitted to turn freely, moving about and when reeling in a fish or a number of fish, as the fish turn over, they will turn about the swivel and will not twist the line.

It is another object of the present invention to provide a swivel arm hook assembly for fishing lines which can use a single, double or triple hook of varying sizes to permit a variety of bait to be used simultaneously and to hook fish of varying size. These hooks are so arranged that they will not tangle when casting or reeling in and eliminate the necessity of reeling the line in a few feet to relocate the hook.

Other objects of the invention are to provide a swivel arm hook assembly for fishing lines bearing the above objects in mind which is of simple construction, has a minimum number of parts, is inexpensive to manufacture and efficient in operation.

For other objects and a better understanding of the invention, reference may be had to the following detailed description taken in connection with the accompanying drawing, in which:

Figure 1 is a perspective view of a preferred embodiment of the present invention;

Fig. 2 is an enlarged vertical sectional view thereof taken along the line 2—2 of Fig. 1; and Fig. 3 is a horizontal sectional view taken along the line 3—3 of Fig. 2.

Referring now more in detail to the drawing, 10 represents a hollow cylindrical body open at the bottom and integrally formed at its upper end with the top closure 11 having a central circular opening 12 for a purpose which will hereinafter become clear.

The body 10 is provided with three equi-angularly spaced openings 13 within which are positioned the downwardly and outwardly extending hook arms or rods 14, the rods 14 being mounted within the body 10 at the proper angulation shown by means of the solder 14'. The eyes 15 are integrally formed at the outer ends of the rods 14 and mounted thereon the loops 16 which in turn mount the looped upper ends 17 of the fish hook 18.

As a means of connecting the body 10 to the fish line 19, a hollow spheroidal swivel casing 20 is positioned within the opening 12, being secured thereat by means of solder 21 (Fig. 2). The upper end of the spheroidal casing 20 is provided with an opening 22 which receives downwardly therethrough the link 23 which terminates at its lower end within the casing in the spherical ball 24. An eye 25 is integrally formed at the upper end of the link 23 for connection with the line 19, substantially as illustrated. A spherical weight 26 depends from the inner end of the casing 20 by means of the connecting link 27 and serves to retain the body 10 in the vertical position as the casing 20 rotates about the ball joint 24, as will be obvious.

A solid plug 28 of solder is formed in the open lower end of the body 10 and serves as a sinker weight.

The loop 25 provides a connection with the line 19 having plenty of space to tie the line thereon without difficulty, including lines of any size. Any other attaching means may, of course, be employed without departing from the spirit and scope of the invention.

The hook attachment loops 16 will permit the attachment of additional members, as desired. Any hook attachment or devices, not shown, can be added to the loops 16 and one hook, two or three can be used. Any size hook may also be used and the variation in the sizes permits the fisherman to catch fish of varying size simultaneously. Three different varieties of bait can be used simultaneously and one of those may be the bait that the fish is biting. A small minnow can be placed on one of the hooks 18 and it will move it around about the stream, while the two other hooks will be provided with other bait. This eliminates the necessity of reeling in a few feet of line to relocate the hook, and it will be noted that the hooks thus arranged will not tangle when casting or reeling in, and when the entire assembly is in motion due to the catch, the swivel construction will permit the assembly to rotate without twisting the line.

It will be noted that the sinker plug 28 eliminates the conventional worry associated with sinkers, being built in and eliminating the usual tangling associated therewith. This plug 28 is of sufficient weight so that it may be used with smaller floaters fully baited and will not sink the floaters when loaded.

While in the drawing three rods or hook ons 14 are shown, it will be readily apparent that any number may be employed.

It should now be apparent that there has been provided a swivel arm hook assembly for fish lines which operates entirely upon a novel swivel construction and wherein when the fishing assembly is cast, the fishing gear will rotate freely without twisting the line.

It will also be apparent that there has been provided a swivel arm hook assembly of the above type wherein under-current will rotate the body and hooks freely, to move the hooks about in a realistic manner and that when reeling in to shore, a live fish, or number of fish, will be permitted to rotate the body and hooks about the swivel without twisting the line.

While various changes may be made in the detail construction, it shall be understood that such changes shall be within the spirit and scope of the present invention as defined by the appended claim.

What I claim as new and desire to protect by Letters Patent of the United States is:

A swivel arm hook assembly for fishing lines comprising, in combination, an elongated hollow body member open at one lower end, a solid plug filling said open end of said body member, a plurality of equally spaced apart and outwardly extending rods supported upon said body member between the opposite ends thereof, a top closure having a central circular opening supported at the opposite upper end of said body member, a substantially hollow spheroidal casing positioned within said opening extending upwardly therethrough, means securing said casing within said opening, said casing defining an opening at the upper end thereof, a link member passing downwardly through said opening in said casing and terminating in an enlarged ball joint rotatably mounted within said casing for relative universal movement therebetween, a weight, a link connecting said weight below said casing to retain said body in a substantially vertical position, an enlarged eye integrally formed at the upper end of said link member and receiving the end of the fishing line therethrough, eyes integrally formed at the outer ends of said rods, loops threaded through said eyes, and said loops receiving thereon the eyes of the fish hooks.

References Cited in the file of this patent

UNITED STATES PATENTS

| | | |
|---|---|---|
| 752,091 | Miller | Feb. 6, 1904 |
| 1,352,979 | Lawrence | Sept. 14, 1920 |
| 1,636,904 | Elwood | July 26, 1927 |
| 2,085,320 | Kolstrand | June 29, 1937 |
| 2,192,375 | Goodale | Mar. 5, 1940 |
| 2,605,576 | Young et al. | Aug. 5, 1952 |
| 2,739,408 | Eatinger | Mar. 27, 1956 |